United States Patent [19]

Ogawa

[11] Patent Number: 4,467,415
[45] Date of Patent: Aug. 21, 1984

[54] HIGH-SPEED MICROPROGRAM CONTROL APPARATUS WITH DECREASED CONTROL STORAGE REQUIREMENTS

[75] Inventor: Hiroshi Ogawa, Tokyo, Japan

[73] Assignee: Nippon Electric Co., Ltd., Tokyo, Japan

[21] Appl. No.: 298,211

[22] Filed: Aug. 31, 1981

[30] Foreign Application Priority Data

Sep. 4, 1980 [JP] Japan ................. 55-122724

[51] Int. Cl.³ .............................................. G06F 9/36
[52] U.S. Cl. ................................................ 364/200
[58] Field of Search ............................... 364/200, 900

[56] References Cited

U.S. PATENT DOCUMENTS

| | | | |
|---|---|---|---|
| 3,760,369 | 9/1973 | Kemp | 364/200 |
| 3,800,293 | 3/1974 | Enger et al. | 364/200 |
| 3,958,227 | 5/1976 | Evans | 364/200 |
| 3,988,719 | 10/1976 | Whitby et al. | 364/200 |
| 4,156,279 | 5/1979 | Wilhite | 364/200 |
| 4,254,461 | 3/1981 | Chemla et al. | 364/200 |
| 4,307,445 | 12/1981 | Tredennick et al. | 364/200 |
| 4,325,121 | 4/1982 | Gunter et al. | 364/200 |
| 4,338,661 | 7/1982 | Tredennick et al. | 364/200 |
| 4,348,721 | 9/1982 | Brereton et al. | 364/200 |
| 4,370,709 | 1/1983 | Fosdick | 364/200 |
| 4,373,180 | 2/1983 | Linde | 364/200 |

Primary Examiner—Jerry Smith
Assistant Examiner—Michael R. Fleming
Attorney, Agent, or Firm—Sughrue, Mion, Zinn, Macpeak, and Seas

[57] ABSTRACT

A microprogrammed control apparatus includes a first control store for providing a first sequence of microinstructions and a second control store which includes first and second control store portions providing first and second sets, respectively, of microinstructions. A selection circuit selects a first microinstruction from the first control store followed by a first set of subsequent microinstructions from the second control store portion, etc. A second selection circuit will select either the selected microinstruction from the first selection circuit or control information provided from a control store. The address for reading out the microinstructions from the first and second control store portions is determined in accordance with the branch address field of the microinstruction currently being executed.

6 Claims, 4 Drawing Figures

HIGH-SPEED MICROPROGRAM CONTROL APPARATUS WITH DECREASED CONTROL STORAGE REQUIREMENTS

BACKGROUND OF THE INVENTION

The present invention relates to a microprogram control (to be referred to as "MC" hereunder) apparatus for controlling the sequence of elementary operations within an information handling system.

Such an MC apparatus for higher speed processing has been proposed in the U.S. Pat. No. 3,800,293. The proposed apparatus is equipped with first and second control stores 18 and 19 as shown in the drawing each of which stores a plurality of microinstructions for carrying out a system instruction of higher order. With this apparatus, the final microinstruction (MI-instruction) of the plurality of MI-instructions stored in the first control store (CS) 18 is executed concurrently and in parallel with the execution of the initial MI-instruction of the plural MI-instructions stored in the second CS 19. However, the other MI-instructions stored in the two CSs 18 and 19 are performed serially. In this way, since the final MI-instruction of the first system instruction and the first MI-instruction of the second system instruction are executed in parallel, the total execution time required can be comparatively reduced as compared with the sequential processing of such MI-instruction sequences, without stopping the operation of an arithmetic unit.

However, an increased number of MI-instructions for controlling complicated processing causes an increase in the capacity of each of the used CSs, which in turn results in an increase in the memory access time for each of the CSs, disturbing the high-speed operation.

SUMMARY OF THE INVENTION

An object of the present invention is to provide an MC apparatus free from the above-mentioned disadvantages in the prior art apparatus.

As one aspect of the present invention, there is provided an MC apparatus for controlling microinstruction sequences, each microinstruction having a branch address field.

The present apparatus comprises: first CS means for storing control information; second CS means for storing a microinstruction; third CS means composed of a plurality of CS portions, each of which stores a plurality of microinstructions; first selecting means for selecting either said microinstruction given from the second CS means or a selected one of said plurality of microinstructions given from the third CS means; decoding means for decoding at least one microinstruction selected by the first selecting means; and second selecting means for selecting either the decoded result of the decoding means or the control information given from the first CS means, whereby the control information stored in the first CS means is read out from a corresponding address in response to an address given from an external unit; the microinstruction stored in the second CS means is read out from a corresponding address in response to another address given from said unit; and said selected one of said plurality of microinstructions stored in the third CS means is read out from a corresponding address in response to the content of the branch address field of the microinstruction fed from the second control store.

BRIEF DESCRIPTION OF THE DRAWINGS

The present invention will be described hereinafter in more detail referring to the attached drawings in which.

In the drawings, identical reference numerals denote indentical structural elements. Also, each circle marked at a gate represents the inversion of the output of each gate, and signal paths and signals may be used without destruction.

DETAILED DESCRIPTION OF THE PREFERRED EMBODIMENT

Figures 1A, 1B:
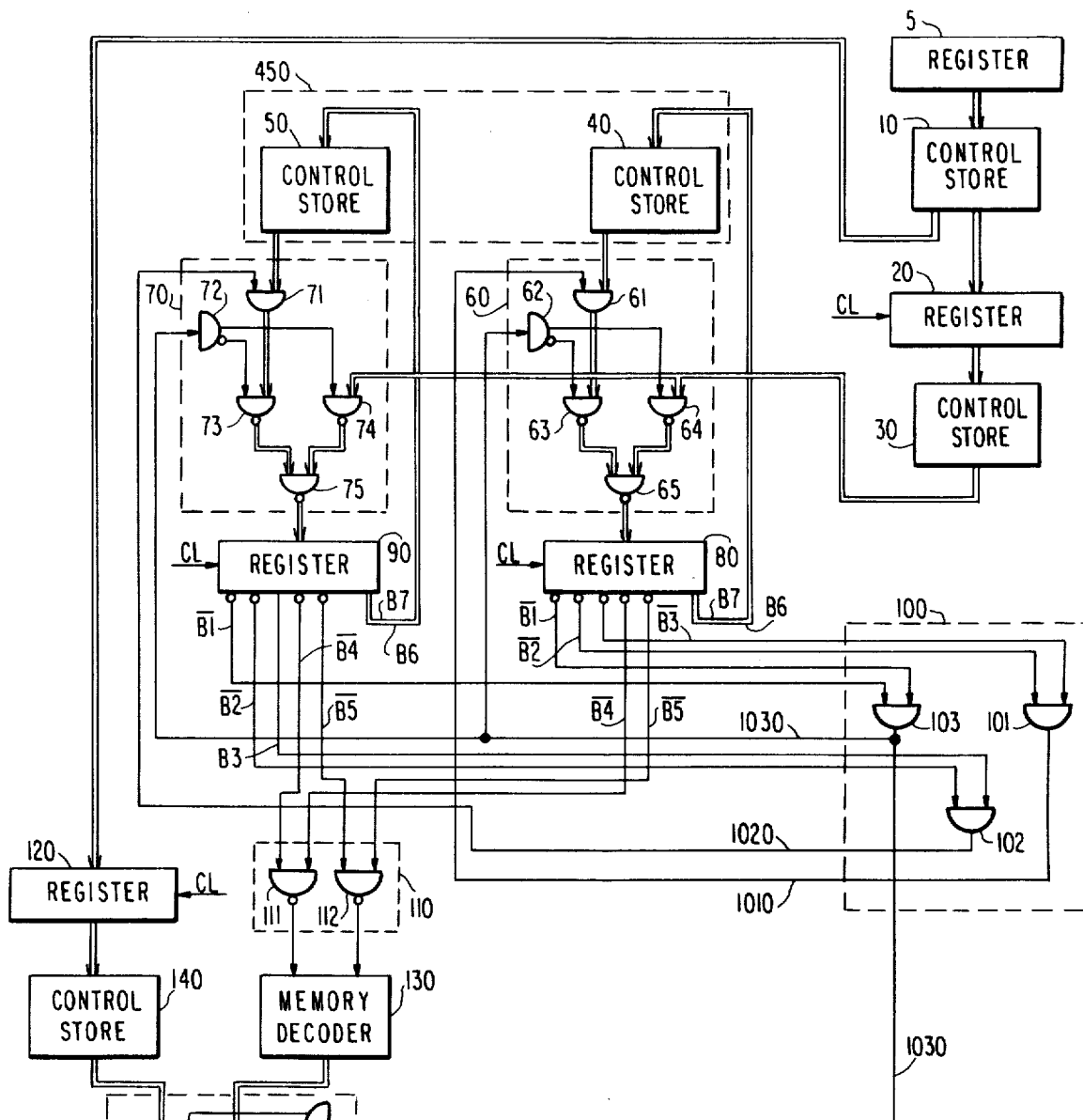
FIG. 1A shows one embodiment of the present invention.
FIG. 1B shows an MI-instruction format used in the invention.

Referring to FIG. 1A, one embodiment of the present invention comprises a macroinstruction register 5 for storing a macroinstruction, an address CS 10 for storing a plurality of addresses, an address register 120 for storing an address given from the CS 10, a first CS 140 for storing control information, an address register 20 for storing said address given from the CS 10, a second CS 30 for storing an MI-instruction, and a third CS 450 composed to two CS portions 40 and 50 (each of which stores plural MI-instructions). Each storage operation for such contents into the register 5 and CSs 10, 140, 30, and 450 is externally done in advance at the time of initialization of the whole apparatus shown in FIG. 1A.

The embodiment further comprises a selector 60 for selecting either the MI-instruction given from the CS 30 or a selected MI-instruction from the CS portion 40, a selector 70 for selecting either the MI-instruction from the CS 30 or a selected MI-instruction from the CS portion 50, an MI-instruction register 80 for storing the output of the selector 60, an MI-instruction register 90 for storing the output of the selector 70, a control circuit 100 responsive to the outputs of the registers 80 and 90, a selector 110 for selecting either of the outputs of the registers 80 or 90 in response to decoder address bits $\overline{B4}$ and $\overline{B5}$, a memory decoder 130 for decoding the output of the selector 110, a selector 150 for selecting either of the outputs of the CS 140 or the decoder 130 in response to the control signal 1030 from the circuit 100, a memory decoder register 160 for storing the output of the selector 150, and an arithmetic unit 170 for performing the operation for the content of the register 160.

Referring to FIG. 1B, each MI-instruction includes an OP (operation) code field having a bit B0, a control information field having bits B1 to B3, a decoder address field having bits B4 and B5, and a branch address field having bits B6 and B7. Each inversion of these bits is shown at $\overline{B1}$, $\overline{B2}$, ..., and $\overline{B7}$, respectively in FIG. 1A.

The selector 60 is composed of an AND circuit 61 for producing a logical product of a signal from the circuit 100 through a signal path 1010 and an MI-instruction from the CS portion 40, a gate 62 for forming a selection signal using the signal given from the circuit 100 via a signal path 1030, and NAND gates 63, 64, and 65 for selecting either of the MI-instructions given from the second CS 30 or the CS portion 40 in response to the selection signal from the gate 62. The selector 70 is identical in structure with the selector 60. The control circuit 100 is comprised of an AND gate 101 for producing a logical product of the bits $\overline{B2}$ and $\overline{B3}$ of the content of the register 80, an AND gate 102 for producing a logical product of the bits B3 and $\overline{B2}$ of the content of the register 90 and an AND gate 103 for producing a logical product of the bit $\overline{B1}$ of the content of the register 80 and the bit $\overline{B1}$ of the content of the register 90.

The selector 110 consists of an NAND gate 111 for producing an inversion of the logical product of the bits $\overline{B4}$ of the contents of the registers 80 and 90 and an NAND gate 112 for producing an inversion of the logical product of the bits $\overline{B5}$ of the contents of the registers 80 and 90. The circuit 150 comprises a gate 151 for forming a selection signal using a signal given via the AND gate 103 of the circuit 100 through the signal path 1030, and NAND gates 152, 153, and 154 for selecting either of the outputs of the memory decoder 130 or the CS 140 in response to the output of the gate 151.

The decoder 130 may be composed of the type shown at 3 of FIG. 1a of the U.S. Pat. No. 4,051,460.

The operation of the embodiment will now be described in detail.

Figure 2A:
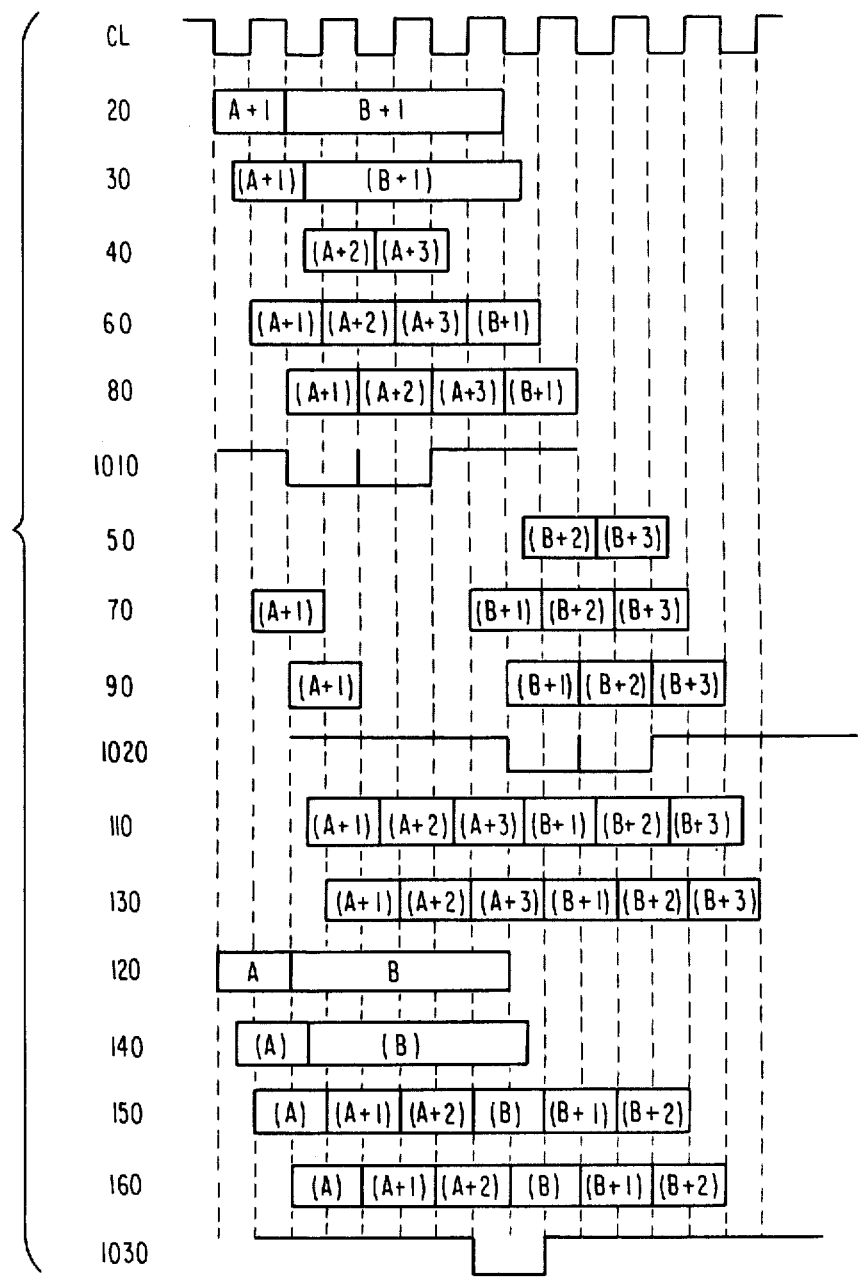
FIG. 2A is a diagram for describing the operation of the embodiment shown in FIG. 1A.
Figure 2B:
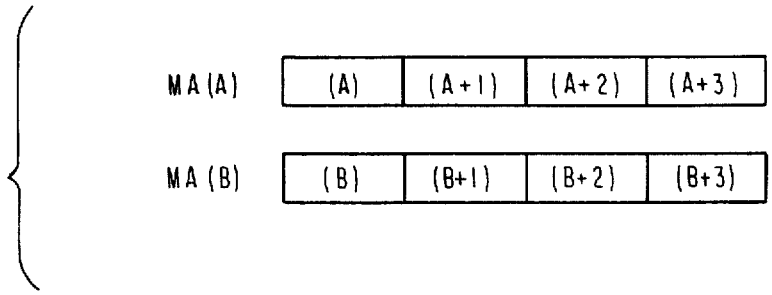
FIG. 2B is a diagram showing the relationship between a macroinstruction and a microinstruction.

Referring to FIG. 2B, a macroinstruction (referred to simply an "instruction") MA(A) consists of control information (A) and 3 MI-instructions (A+1), (A+2), and (A+3), while an instruction MA(B) consists of control information (B) and 3 MI-instructions (B+1), (B+2), and (B+3). Each of the instructions MA(A) and MA(B) has an OP code field and at least one other field such as an address field (not used with the embodiment). Also, the instruction MA(B) is set in the register 5 one clock cycle after the instruction MA(A) is set in the register 5. Also, the control information (A) and (B), the MI-instruction (A+1) and (B+1), the MI-instructions (A+2) and (A+3), and the MI-instructions (B+2) and (B+3) are stored in the CS 140, CS 30, CS portion 40, and CS portion 50, respectively. The execution of each MI-instruction requires one clock (CL) cycle.

Referring to FIGS. 1A and 2A, in response to the OP code of the instruction MA(A) initially set in the register 5, the address A is given from the CS 10 to the register 120 so that the control information (A) stored in the CS 140 is read out. The information (A) is then stored in the register 160 through the selector 150 to control the arithmetic unit 170, since the control circuit 100 produces a "1" from the gate 103 at the initial state of the apparatus of FIG. 1A. Meanwhile, the address A+1 is given from the CS 10 to the register 20, in response to the OP code of the instruction MA(A) set in the register 5, so that the MI-instruction (A+1) stored in the CS 30 is read out. The circuit 100 causes the MI-instruction (A+1) to be selected by the selectors 60 and 70. Thus, the MI-instructions (A+1) selected by the selectors 60 and 70 are stored concurrently in the registers 80 and 90. The MI-instruction (A+2) stored in the CS portion 40 is read out by the branch address field of the MI-instruction (A+1) stored in the register 80. In response to "1s" of both the bits $\overline{B2}$ and $\overline{B3}$ of the register 80, the circuit 100 produces "1" on the path 1010 to read out the MI-instruction (A+2) from the CS portion 40. Further, the decoder 130 produces an output in response to the decoder address field of the MI-instruction (A+1) selected by the selector 110. The output of the decoder 130 is then selected by the selector 150 and stored in the decoder register 160 to control the arithmetic unit 170. Similarly, the MI-instruction (A+3) is read out from the CS portion 40 to be stored in the register 80. By the control information field of the MI-instruction (A+3) stored in the register 80, the termination of the instruction MA(A) is designated so that the circuit 100 can control the selectors 60 and 70 to store, in the registers 80 and 90, the MI-instruction (B+1) of the instruction MA(B) set in the register 5 one CL cycle after the setting of the instruction MA(A) into the register 5. The execution of the instruction MA(B) is performed in a similar manner to that of the instruction MA(A). Namely, the address B is given from the CS 10 to the register 120, in response to the OP code of the instruction MA(B) set in the register 5, so that the control information (B) stored in the CS 140 is read out. The MI-instruction (B+1) is then read out from the CS 30 to be stored in the registers 80 and 90. The MI-instruction (B+2) stored in the CS portion 50 is read out by the branch address field of the MI-instruction (B+1) stored in the register 90. In response to "1s" of both the bits $\overline{B2}$ and B3 of the register 90, the circuit 100 produces "1" on the path 1020 to read out the MI-instruction (B+2) from the CS portion 50. Further, the decoder 130 produces an output in response to the decoder address field of the MI-instruction (B+1) selected by the selector 110. The output of the decoder 130 is then selected by the selector 150 and stored in the register 160 to control the unit 170. Similarly, the MI-instruction (B+3) is read out from the CS portion 50 to be stored in the register 90. By the control information field of the MI-instruction (B+3) stored in the register 90, the termination of the instruction MA(B) is designated.

In this way, the parallel execution of the instructions MA(A) and MA(B) is completed by the use of the plural MI-instructions.

Thus, the present invention allows the parallel execution of plural macroinstructions, by mainly using the CSs 30 and 450 and dividing the CS 450 into the portions 40 and 50, without stopping the operation of the arithmetic unit 170. The adoption of the CS 450 divided into the portions 40 and 50 makes it easy to keep the memory capacity of each of these CS portions small as compared with each CS used in the apparatus shown in the U.S. Pat. No. 3,800,293, to thereby prevent the increase of the memory access time. Similarly, the present invention permits the memory capacity of the CS 30 to become much smaller than that of each CS used in the apparatus shown in the U.S. Pat. No. 3,800,293.

Many modifications and alternatives to the structure shown in FIG. 1 may be made within the scope of the invention defined by the appended claims.

What is claimed is:

1. A microprogrammed control apparatus for controlling microinstruction sequences, each microinstruction having a branch address field, comprising:
first control store means (140) for storing control information and for providing said control information as an output in response to a first address;
first address means (120) for providing said first address to said first control store means;
second control store means (30) for storing at least a first microinstruction and for providing said first microinstruction as an output in response to a second address;
second address means (20) for providing a said second address to said second control store means;
third control store means (450) composed of at least first and second control store portions (40, 50), each of which stores a plurality of microinstructions, said first control store portion providing a selected one of its plurality of microinstructions at its output in response to a third address and said second control store portion providing a respective one of its plurality of microinstructions at its output in response to a fourth address;

third address means (80, 90) for providing said third and fourth addresses to said first and second control store portions in response to the branch address field (B6, B7) of said first microinstruction provided as an output from said second control store means (30);

first selecting means (60, 70, 80, 90, 110) receiving the outputs from said second and third control store means and responsive to first selection signals for selecting either said first microinstruction or a selected one of said plurality of microinstructions given from said third control store means;

decoding means (130) receiving the output of said first selecting means for decoding at least one microinstruction selected by said first selecting means;

second selecting means (150) receiving the outputs from said first control store means (140) and said decoding means (130) and responsive to second selection signals for selecting either the decoded result of the decoding means (130) or the control information given from the first control store means (140); and control means for generating said first and second selection signals.

2. A microprogrammed control apparatus as defined in claim 1, wherein said control means generates first and second control signals and said first selecting means comprises:

a first selector (60) for selectively providing as an output either said first microinstruction or one of said plurality of microinstructions stored in said first control store portion (40) in response to said first control signal;

a second selector (70) for selectively providing as an output either said first microinstruction or one of said plurality of microinstructions stored in said second control store portion in response to said second control signal; and a third selector (110) responsive to outputs of said first and second selectors for providing to said decoding means a signal representing a selected one of the microinstruction outputs from said first and second selectors, said decoding means being responsive to said third selector output for providing as an output said selected one microinstruction output.

3. A microprogrammed control apparatus as defined in claim 2, wherein the branch address field (B6, B7) of the microinstruction currently being provided as an output by said first selector (60) is supplied as an address input to said first control store portion for reading out one of the plurality of microinstructions stored therein, and wherein the branch address field (B6, B7) of the microinstruction currently being provided as an output from said second selector (70) is supplied as an address input to said second control store portion for reading out one of the plurality of microinstructions stored in said second control store portion.

4. A microprogrammed control apparatus as defined in claim 2, wherein said first selecting means further comprises first and second multiple-bit registers (80, 90) for receiving the outputs of said first and second selectors, respectively, said third selector comprising a plurality of logic gates each receiving a pair of corresponding bits from said multiple-bit registers.

5. A microprogrammed control apparatus as defined in claim 2, wherein said first selecting means further comprises first and second multiple-bit registers (80, 90) for receiving the microinstructions provided as outputs from said first and second selectors, respectively, said control means comprising at least a first logic gate (101) for receiving first and second bits from said first register and providing a first logic gate output, at least a second logic gate (102) for receiving as inputs the first and second bits from said second register which correspond to the first and second bits provided to said first logic gate and for providing a second logic gate output, and at least a third logic gate (103) for receiving corresponding bits from each of said first and second registers and providing a third logic gate output, the outputs of said first and third logic gates being provided as said first control signal to said first selector and the outputs of said second and third logic gates being provided as said second control signal to said second selector.

6. A microprogrammed control apparatus as defined in claim 5, wherein said second selecting means performs its selection in accordance with a third control signal and wherein the output of said third logic gate is provided as said third control signal to said second selecting means.

* * * * *